(12) United States Patent
Hickey

(10) Patent No.: US 7,762,039 B2
(45) Date of Patent: Jul. 27, 2010

(54) ELECTRICAL FIXTURE APPARATUS AND INSTALLATION METHOD

(76) Inventor: Thomas B. Hickey, 1472 Highway 395, Gardnerville, NV (US) 89410

( * ) Notice: Subject to any disclaimer, the term of this patent is extended or adjusted under 35 U.S.C. 154(b) by 0 days.

(21) Appl. No.: 12/080,492

(22) Filed: Apr. 4, 2008

(65) Prior Publication Data

US 2009/0249706 A1 Oct. 8, 2009

(51) Int. Cl.
*E04B 1/00* (2006.01)
*E04H 14/00* (2006.01)

(52) U.S. Cl. .................... 52/741.1; 52/742.1; 52/27; 248/323; 248/343; 362/364; 362/365

(58) Field of Classification Search .......... 52/741.1, 52/742.1, 27; 362/364, 365; 248/323, 343
See application file for complete search history.

(56) References Cited

U.S. PATENT DOCUMENTS

| 3,118,558 | A | * | 1/1964 | Stuessel et al. | 220/3.4 |
|---|---|---|---|---|---|
| 3,697,742 | A | * | 10/1972 | Bobrick | 362/366 |
| 4,450,512 | A | * | 5/1984 | Kristofek | 362/276 |
| 4,760,510 | A | * | 7/1988 | Lahti | 362/365 |
| 5,124,901 | A | * | 6/1992 | Sojka et al. | 362/366 |
| 5,315,292 | A | * | 5/1994 | Prior | 340/628 |
| 5,477,439 | A | * | 12/1995 | Kowalenko et al. | 362/260 |
| 5,549,266 | A | * | 8/1996 | Mitchell et al. | 248/205.1 |
| 6,082,878 | A | * | 7/2000 | Doubek et al. | 362/365 |
| 6,241,368 | B1 | * | 6/2001 | Depino | 362/364 |
| 6,257,743 | B1 | * | 7/2001 | Ursch | 362/418 |
| 6,652,124 | B2 | * | 11/2003 | Schubert et al. | 362/285 |
| 6,848,813 | B2 | * | 2/2005 | Patz et al. | 362/432 |
| 7,117,591 | B1 | * | 10/2006 | Gretz | 29/854 |
| 7,172,160 | B2 | * | 2/2007 | Piel et al. | 248/27.1 |
| 7,281,697 | B2 | * | 10/2007 | Reggiani | 248/323 |
| 7,320,536 | B2 | * | 1/2008 | Petrakis et al. | 362/364 |
| 7,462,775 | B1 | * | 12/2008 | Gretz | 174/50 |
| 2003/0014939 | A1 | * | 1/2003 | DeWall | 52/741.1 |
| 2007/0206374 | A1 | * | 9/2007 | Petrakis et al. | 362/147 |
| 2008/0165535 | A1 | * | 7/2008 | Mazzochette | 362/294 |

* cited by examiner

*Primary Examiner*—Richard E Chilcot, Jr.
*Assistant Examiner*—Mark R Wendell

(57) ABSTRACT

An electric junction fixture is provided for preparing a wall or ceiling to accept an appliance such as an electric light fixture, inserted and mounted through a hole in the drywall or panel. Reduced stress levels in the drywall or panel are obtained by providing large areas of contact between the fixture and the drywall or panel.

6 Claims, 4 Drawing Sheets

ELECTRICAL FIXTURE APPARATUS AND INSTALLATION METHOD

BACKGROUND

1. Field of the Invention

This invention relates to a fixture for mounting electric lights and the like in walls and ceilings. During construction, fixtures are sometimes mounted on studs prior to installing paneling, plasterboard, or drywall. This does not always provide the optimum location with regard to locations of sinks, cabinets, desks and the like. Other fixtures can be installed after the paneling, plasterboard, or drywall is installed, and at a location to functionally suit the surroundings. This invention provides for such installations and is cost effective, easy to install, and structurally sound.

2. Description of Prior Art

Junction fixtures that mount to studs and beams are in common usage. This method restricts the location of the mounted fixture to stud or beam locations.

U.S. Pat. No. 7,117,591, Gertz, discloses a junction fixture that does not require mounting on a stud. The fixture is mounted through a hole in the panel or drywall. Screws are used to attach the fixture to the panel or drywall.

U.S. Pat. No. 6,241,368, Depino, discloses a junction fixture that does not require mounting on a stud. The fixture is mounted through a hole in the panel or drywall. A clamping mechanism, operated by screws and levers, clamps the fixture to the drywall. This clamping mechanism utilizes minimal area contact between the clamp and the drywall.

Electric lights and the like are attached to the junction fixture. Many are heavy and cantilevered at a significant distance from the panel or drywall. High stresses are therefore transferred from these arrangements to the panel or drywall. Screw attachments to the panel or drywall are often stressed beyond their yield strength. The act of changing light bulbs, for example, can produce added stress and can contribute to looseness or fracture. The small area used on the levers and clamps of some junction fixtures leads to high stress areas and to resulting looseness or fracture.

Hence, there is a need for a structurally sound junction fixture that produces low stress levels in the panel or drywall, is easy to install, and is inexpensive to manufacture.

PRESENT INVENTION—OBJECTS AND ADVANTAGES

Accordingly, the present invention overcomes these difficulties. Mounted through a hole in the panel or drywall, the units are easy to install. They are economical and provide a rigid and strong joint with the panel or drywall. Loads are distributed over large areas for minimum stress and distortion.

The unit of this invention has two main parts; a body and a cover. The body contains a central cylindrical cup with arms attached to the cylindrical cup that are diametrically opposed. The bottom of the cylindrical cup has at least one hole or "knock out" for passage of electrical wiring. A hole is provided in the panel or drywall that is slightly larger than the cylindrical cup of the body. The arms and the body are inserted through the hole in the panel. The cylindrical cup is then approximately centered in the hole. The cover is then applied to the body and attached with screws. The cover contains a skirt that takes up the space between the hole and the outside diameter of the cylinder, thus providing for a minimum space between the panel hole and the invention structure. Tightening the screws causes load distribution to the drywall by an appropriately large area flange around the cover on the exposed side of the panel, and the large area of the two arms attached to the cylinder on the opposite or back side of the panel.

DRAWING FIGURES

DESCRIPTION

Figure 1:
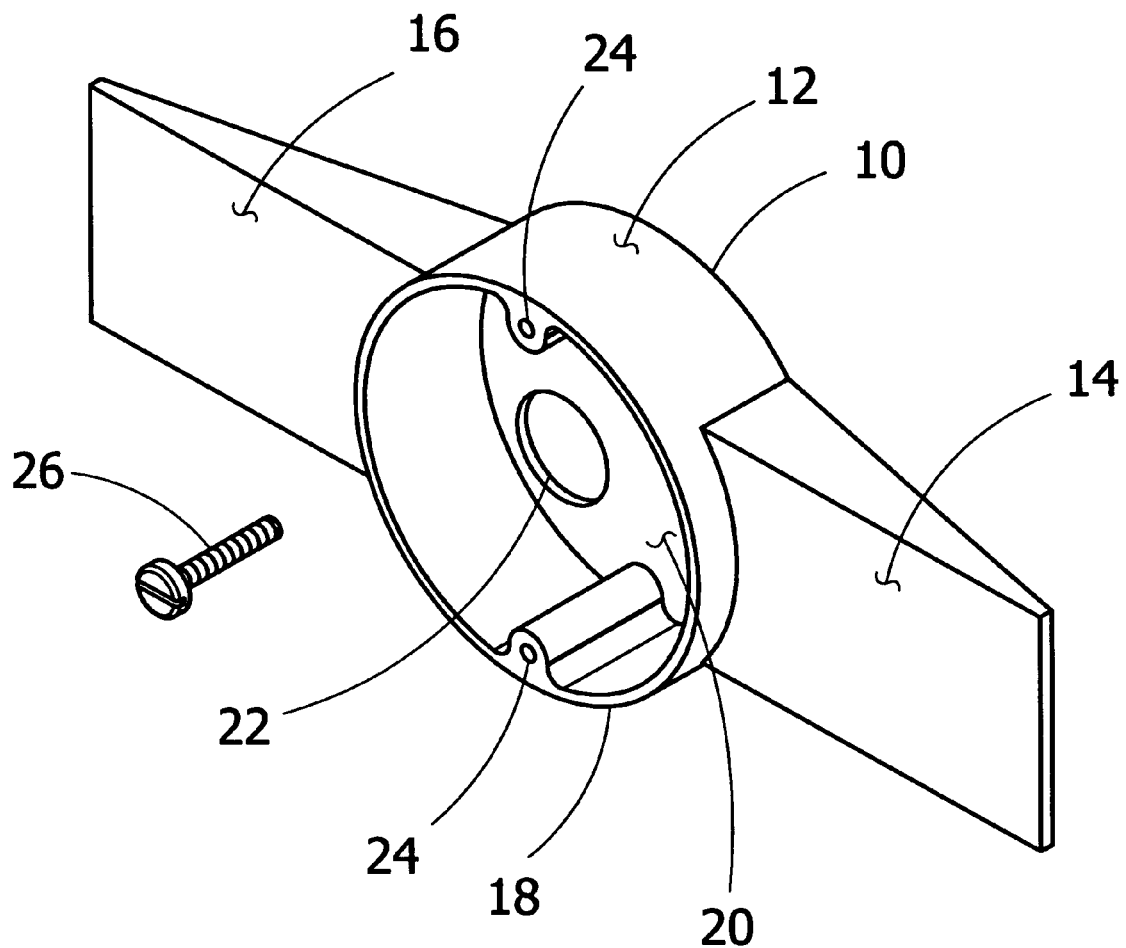
FIG. 1 shows an isometric view of the body.

FIG. 1 shows a plan view of the body 10. A cylindrical cup 12 has arm 14 and arm 16 attached and diametrically opposed. Arms 14 and 16 are integral with and rigidly attached to cup 12. Cup 12 has a thin circumferential wall 18 and a bottom 20. Bottom 20 has at least one hole 22 through which electrical wiring can pass. Internally threaded bosses 24 are attached to both circumferential wall 18 and bottom 20. Arm 14 and aim 16 are shown as being of equal length but need not be so. In fact, for wall mounting, it may be desirable to have arm 14 (positioned above) be longer than arm 16 (positioned below) to absorb the higher moment loads associated with a hanging light fixture or the like (see FIG. 4). Screws 26 are inserted in threaded bosses 24 and are ready to receive cover 30 as will be described.

Figure 2:
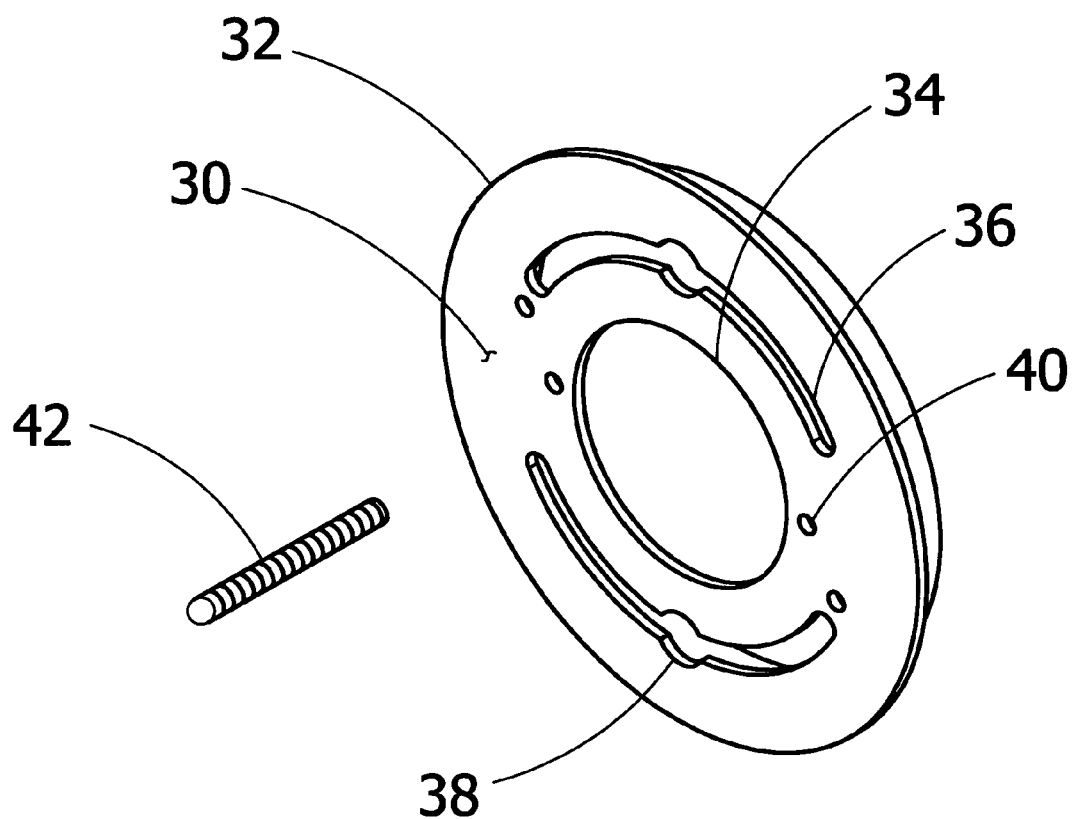
FIG. 2 shows an isometric view of the cover.

FIG. 2 shows a plan view of cover 30. Circular flat plate 32 contains a central hole 34 through which electrical wiring can pass. Circular slots 36 are strategically located to coincide with the spacing of bosses 24 of FIG. 1. Clearance holes 38 are located approximately at the mid point of circular slots 36 and provide clearance for entrance of the heads of screws 26 of FIG. 1. Single holes could be substituted for the clearance holes 38 and circular slots 36. Threaded holes 40 and threaded studs 42 are provided for appliance attachment, such as lighting fixtures and the like.

Figure 3:
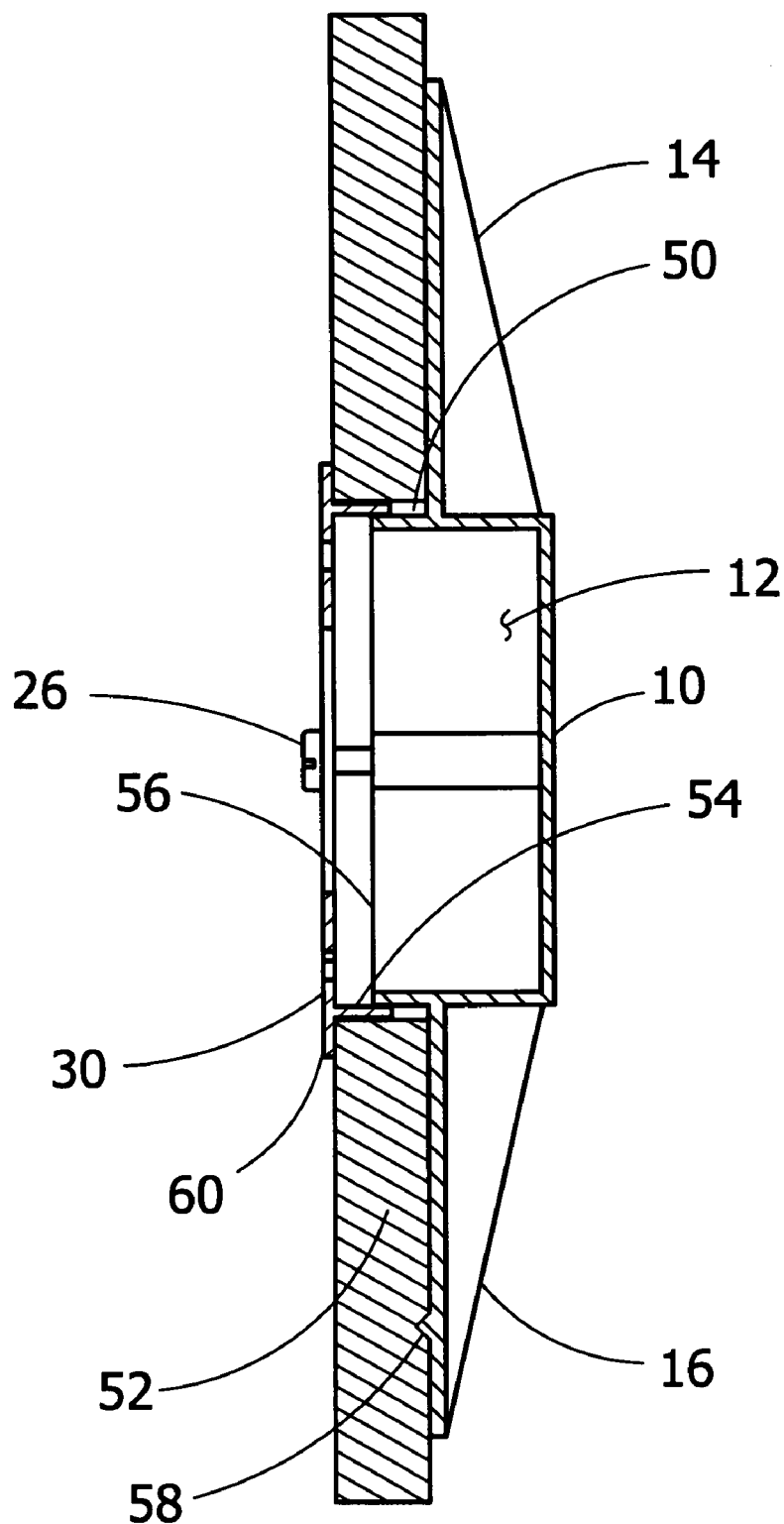
FIG. 3 shows a cross-section of the invention installed in a panel or drywall.

FIG. 3 shows a circular panel hole 50 in panel 52. Body 10, in its entirety, is installed from the exposed side of panel 52 completely and entirely through hole 50 to the back side of panel 52. Cylindrical cup 12 is then approximately centered in hole 50 from the back side of panel 52. Then cover 30 is installed on the exposed side of panel 52. In this view, cover 30 has been inserted onto body 10 over heads of screws 26, and then cover 30 is rotated until screws 26 come to the stop provided in circular slots 36 (see FIG. 2). Screws 26 are then tightened and the fixture is secure. Panel hole 50 is sufficiently large so that body 10, complete with arms 14 and 16 and cup 12, can integrally be easily inserted through panel hole 50 and then positioned as shown. Skirt 54 is of sufficient width to occupy the space between panel hole 50 and cylindrical cup 12, in compliance with electrical code clearance requirements. Skirt 54 is of a length that allows compression of panel 52 between body 10 and cover 30. Likewise, the offset from rim 56 of cup 12 to arm 14 and arm 16 allows compression of panel 52. Arm 14 and arm 16 are shown in FIG. 1 as rectangular in shape, but may be triangular or trapezoidal, etc, and may have projections 58 that penetrate panel 52 for added stability. The faying surface of arm 14 and arm 16 (with panel 52) may contain slight non-parallel bias to promote superior retention. Flange 60 of cover 30 is sufficiently large to provide ample area of engagement with panel 52.

Figure 4:
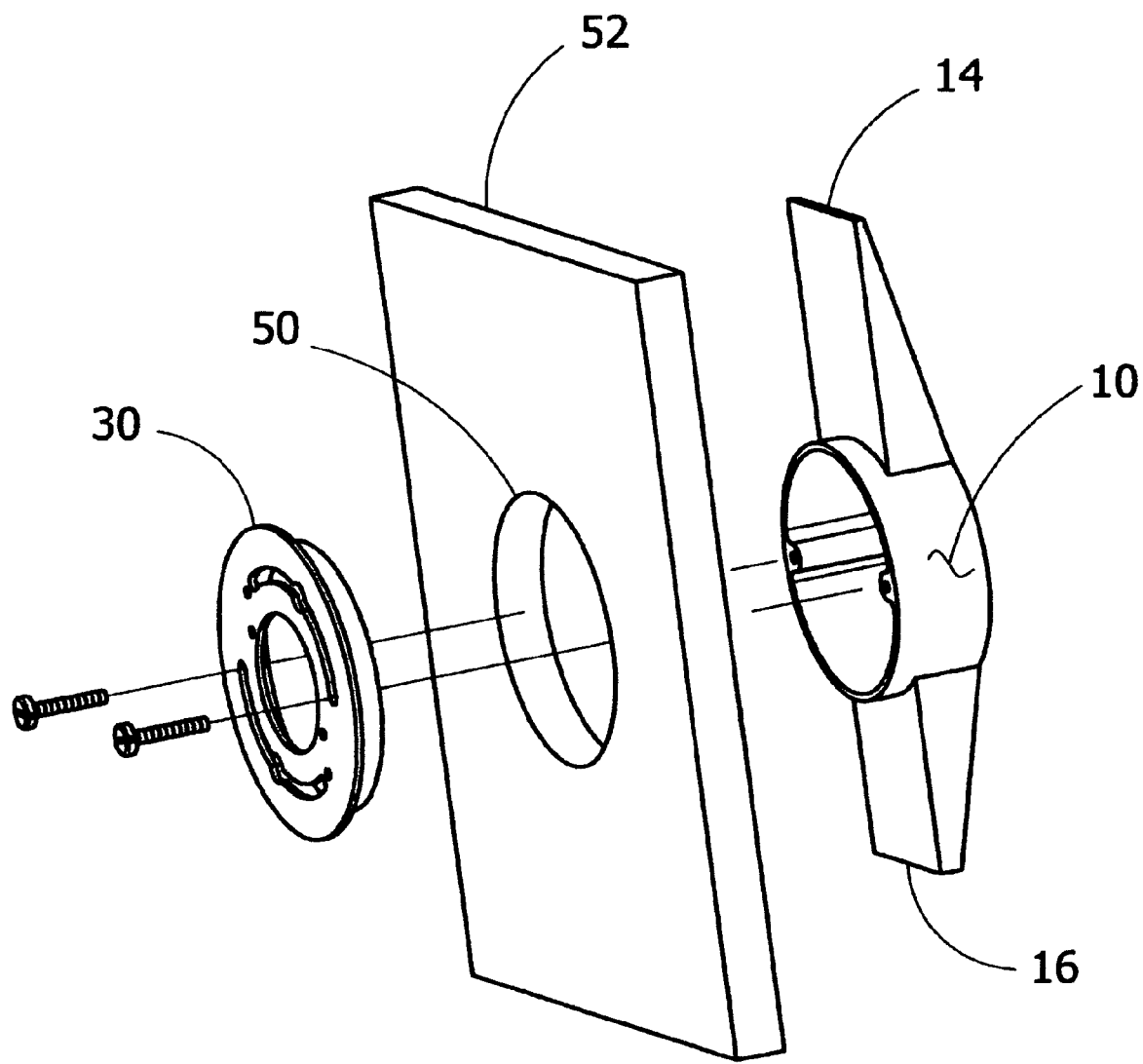
FIG. 4 shows an exploded view of the invention.

FIG. 4 is an exploded view of a wall mount incorporating the teaching of the invention. Arms 14 and 16 are shown as different in length. Body 10 is shown as having passed through hole 50 and now facing the back side of panel 52. Cover 30 is facing the exposed side of panel 52.

Body 10 and cover 30 may be made of metal or suitable nonmetallic material.

CONCLUSIONS

Accordingly, this invention is an inexpensive means of providing a junction fixture. The invention is easy to use and effectively distributes loading to the panel on which it is installed.

It will be appreciated that while particular embodiments of the invention have been shown and described, modifications may be made. It is intended in the claims to cover all modification that come within the true spirit and scope of the invention.

I claim:

1. A junction fixture, installed through a hole in a panel, said panel having an exposed side and a back side, for mounting of electrical appliances, comprising:
   a) a body installed through said exposed side of said panel completely through said hole to said back side of said panel, comprising:
      1) a cylindrical cup approximately centered in said hole from said backside of said panel,
      2) load bearing arms that abut said backside of said panel, said load bearing arms integral with and joined rigidly to said cylindrical cup,
   3) clamping means, and
   b) a cover mounted on said exposed side of said panel, comprising:
      1) slots for accepting said clamping means,
      2) appliance support means, and
      3) open area for passage of electrical wiring,
   whereby joining said cover through said hole to said body and manipulating said clamping means causes said junction fixture to be rigidly attached to said panel and is therefore prepared to support attached appliances.

2. The junction fixture of claim 1 wherein said clamping means comprises the threaded portion a of screws passing through said cover and threaded into bosses of said cylindrical cup.

3. The junction fixture of claim 1 wherein said arms contain projections for penetrating said panel.

4. The junction fixture of claim 1 wherein said arms are of different lengths.

5. The junction fixture of claim 1 wherein said cover contains a skirt that essentially fills the space between said hole and said cylindrical cup,
   whereby the requirements of electrical codes regarding allowable space around an electrical fixture are satisfied.

6. A method of installing a junction fixture in a panel having an exposed side and a backside, comprising:
   a) preparing a hole in said panel,
   b) inserting a body, comprising a cylindrical cup with rigidly attached load bearing arms, completely through said hole,
   c) positioning said body from said backside of said panel, in said hole to receive a cover,
   d) fitting said cover onto said body from said exposed side of said panel, and
   e) actuating a clamping means to clamp said panel between said cover and said body,
whereby said junction fixture is rigidly attached to said panel.

* * * * *

UNITED STATES PATENT AND TRADEMARK OFFICE
CERTIFICATE OF CORRECTION

| | | |
|---|---|---|
| PATENT NO. | : 7,762,039 B2 | Page 1 of 1 |
| APPLICATION NO. | : 12/080492 | |
| DATED | : July 27, 2010 | |
| INVENTOR(S) | : Thomas B Hickey | |

It is certified that error appears in the above-identified patent and that said Letters Patent is hereby corrected as shown below:

Column 4:

Replace claim 2 with the following:

2. The junction fixture of claim 1 wherein said clamping means comprises a threaded portion of screws passing through said cover and threaded into bosses of said cylindrical cup.

Signed and Sealed this
Eighth Day of May, 2012

David J. Kappos
*Director of the United States Patent and Trademark Office*

UNITED STATES PATENT AND TRADEMARK OFFICE
CERTIFICATE OF CORRECTION

PATENT NO.       : 7,762,039 B2
APPLICATION NO.  : 12/080492
DATED            : July 27, 2010
INVENTOR(S)      : Thomas B Hickey Page 1 of 1

It is certified that error appears in the above-identified patent and that said Letters Patent is hereby corrected as shown below:

Column 4, lines 6-9

Replace claim 2 with the following:

2. The junction fixture of claim 1 wherein said clamping means comprises a threaded portion of screws passing through said cover and threaded into bosses of said cylindrical cup.

This certificate supersedes the Certificate of Correction issued May 8, 2012.

Signed and Sealed this
Twelfth Day of June, 2012

David J. Kappos
*Director of the United States Patent and Trademark Office*